US008206017B2

(12) United States Patent
Zwick (10) Patent No.: US 8,206,017 B2
(45) Date of Patent: Jun. 26, 2012

(54) ILLUMINATION DEVICE FOR A MOTOR VEHICLE

(75) Inventor: Hubert Zwick, Stuttgart (DE)

(73) Assignee: Automotive Lighting Reutlingen GmbH (DE)

( * ) Notice: Subject to any disclaimer, the term of this patent is extended or adjusted under 35 U.S.C. 154(b) by 71 days.

(21) Appl. No.: 12/916,860

(22) Filed: Nov. 1, 2010

(65) Prior Publication Data

US 2011/0103084 A1    May 5, 2011

(30) Foreign Application Priority Data

Nov. 3, 2009   (DE) .................. 10 2009 052 339

(51) Int. Cl.
*F21V 8/00*    (2006.01)
(52) U.S. Cl. .................. 362/511; 362/560; 362/612
(58) Field of Classification Search .................. 362/511, 362/560, 612, 613, 555, 628, 545
See application file for complete search history.

(56) References Cited

U.S. PATENT DOCUMENTS

| 7,654,722 B2 * | 2/2010 | Chen et al. ............... 362/619 |
| 7,686,497 B2 * | 3/2010 | Kropac et al. ............ 362/626 |
| 7,744,230 B2 * | 6/2010 | Mezouari et al. .......... 362/26 |
| 2002/0036905 A1 | 3/2002 | Mabuchi |
| 2005/0213351 A1 * | 9/2005 | Yang ...................... 362/633 |
| 2006/0067084 A1 * | 3/2006 | Stefanov ................. 362/511 |
| 2008/0232127 A1 * | 9/2008 | Futami .................... 362/511 |

FOREIGN PATENT DOCUMENTS

| DE | 198 31 002 A1 | 4/2000 |
| DE | 103 11 317 A1 | 9/2004 |
| DE | 10 2008 016 764 A1 | 10/2009 |

OTHER PUBLICATIONS

Dec. 23, 2010 European Search Report for EP 10 01 3485.

* cited by examiner

*Primary Examiner* — Laura Tso
(74) *Attorney, Agent, or Firm* — Bliss McGlynn, P.C.

(57) ABSTRACT

An illumination device (11) for a motor vehicle includes a transparent light guide (13). At least a first decoupling element (33) is formed into the light guide (13). At least one reflector (35) is assigned to the first decoupling element (33) for reflection of light coupled-out by the first decoupling element (33) and aligned and formed in such a way that at least a portion of the light reflected by the reflector (35) irradiates the light guide (13). At least one second decoupling element (37) is formed in the light guide (13) for coupling-out of light from the light guide (13) and aligned and formed in such a way that light coupled-out by the second decoupling element (37) ultimately exits the light guide (13).

15 Claims, 6 Drawing Sheets

ILLUMINATION DEVICE FOR A MOTOR VEHICLE

CROSS-REFERENCE TO RELATED APPLICATION

This application claims priority to and benefit of the filing date of German Patent Application 10 2009 052 339.1 entitled "Illumination Device for a Motor Vehicle" and filed on Nov. 3, 2009.

BACKGROUND OF INVENTION

1. Field of Invention

The invention relates, generally, to an illumination device for a motor vehicle and, more specifically, to such a device a light guide of which is relatively strongly curved and/or first decoupling elements together with reflectors assigned to them of the device are arranged relatively tightly packed on the light guide.

2. Description of Related Art

An illumination device for a motor vehicle is described in DE 10 2008 016 764. If a light guide of the device is relatively strongly curved and/or if first decoupling elements together with reflectors assigned to them of the device are arranged relatively tightly packed on the light guide, then danger exists that light beams will be deflected in an undesirable direction or be absorbed within the device. A light beam that has been reflected by/from a reflector can impinge on a rear side of an adjacent reflector so that light cannot again penetrate the light guide unimpeded. Overall, the device, therefore, exhibits a relatively low efficiency in the case of the light guides being relatively strongly curved or first decoupling elements being arranged relatively tightly packed on the light guide. That means that of the light that is coupled-in the light guide, a relatively low percentage of such light will be emitted in accordance with a desired pre-defined light distribution.

Thus, there is a need in the related art for an illumination device for a motor vehicle that, in the case of decoupling elements thereof being arranged relatively tightly next to each other and/or light guides of the device being relatively strongly curved, exhibits a high degree of efficiency. More specifically, there is a need in the related art for such a device light beams of which will not be deflected in an undesirable direction or absorbed within the device. Also, there is a need in the related art for such a device light of which can again penetrate a light guide unimpeded. Furthermore, there is a need in the related art for such a device a relatively high percentage of light of which that is coupled-in the light guide will be emitted in accordance with a desired pre-defined light distribution.

SUMMARY OF INVENTION

The invention overcomes the disadvantages in the related art in an illumination device for a motor vehicle includes a transparent light guide. At least a first decoupling element is formed into the light guide. At least one reflector is assigned to the first decoupling element for reflection of light coupled-out by the first decoupling element and aligned and formed in such a way that at least a portion of the light reflected by the reflector irradiates the light guide. At least one second decoupling element is formed in the light guide for coupling-out of light from the light guide and aligned and formed in such a way that light coupled-out by the second decoupling element ultimately exits the light guide.

One advantage of the illumination device for a motor vehicle of the invention is that it, in the case of the decoupling elements being arranged relatively tightly next to each other and/or the light guide being relatively strongly curved, exhibits a high degree of efficiency.

Another advantage of the illumination device for a motor vehicle of the invention is that light beams of it will not be deflected in an undesirable direction or be absorbed within the device.

Another advantage of the illumination device for a motor vehicle of the invention is that light of it can again penetrate the light guide unimpeded.

Another advantage of the illumination device for a motor vehicle of the invention is that a relatively high percentage of light of the device that is coupled-in the light guide will be emitted in accordance with a desired pre-defined light distribution.

Another advantage of the illumination device for a motor vehicle of the invention is that, in contrast to the first decoupling element, the second decoupling element couples the light directly out of the light guide without conducting the light again through the light guide by means of the reflector.

Another advantage of the illumination device for a motor vehicle of the invention is that the light guide can be formed from any transparent material—preferably, plastic material and, in particular, polymethylmethacrylate (PMMA).

Another advantage of the illumination device for a motor vehicle of the invention is that the light guide can be produced in great quantities simply by injection-molding.

Another advantage of the illumination device for a motor vehicle of the invention is that the decoupling elements are a single component.

Other objects, features, and advantages of the illumination device for a motor vehicle of the invention will be readily appreciated as the same becomes better understood while reading the subsequent description taken in conjunction with the accompanying drawings.

BRIEF DESCRIPTION OF EACH FIGURE OF DRAWING OF INVENTION

DETAILED DESCRIPTION OF EMBODIMENTS OF INVENTION

Figure 1:
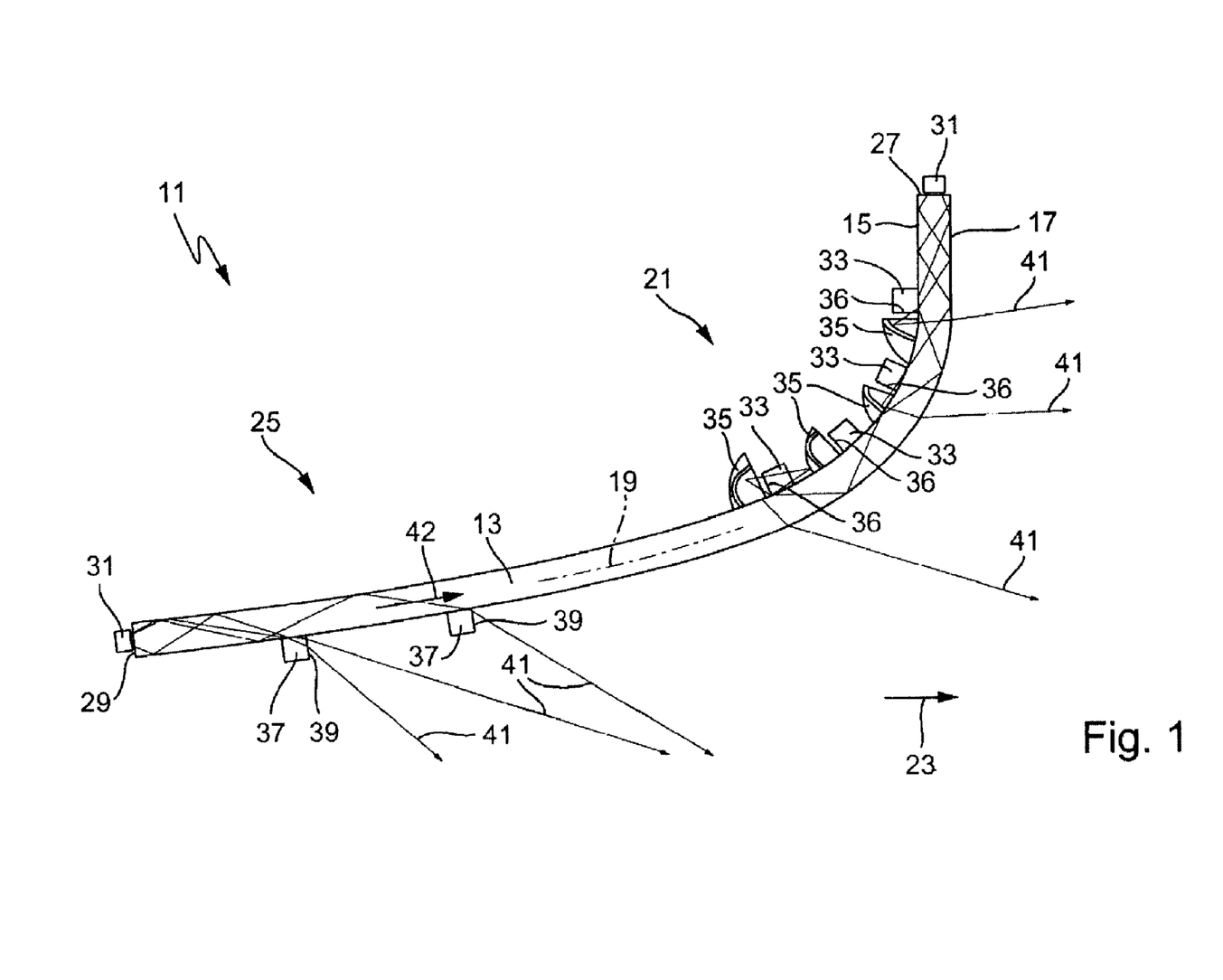
FIG. 1 is a top view of an illumination device for a motor vehicle of the invention in accordance with a first embodiment thereof.

FIG. 1 shows a motor-vehicle illumination device 11. In the case of the illumination device 11, it can, for example, be a motor-vehicle headlight or a motor-vehicle light, in particular, a taillight. The illumination device 11 exhibits a curved, on the whole, plate-shaped light guide 13. The light guide 13 exhibits a substantially constant thickness so that a first side 15 of the light guide 13 runs parallel to a second side 17 of the light guide 13. The two sides 15, 17, in turn, run parallel to a longitudinal axis 19 (shown in sections in FIG. 1 for clarity's sake) of the light guide 13. In deviation from the shown embodiment, the light guide 13 can also exhibit a varying thickness along its longitudinal axis 19 so that the two sides 15, 17 are not parallel to one another.

At a first section 21 of the light guide 13, the two sides 15, 17 and longitudinal axis 19 of the light guide 13 are relatively strongly inclined vis-à-vis a main direction of light emission (arrow 23) while this inclination vis-à-vis the main direction of light emission 23 in a second section 25 of the light guide 13 is slight in comparison to the first section 21. The light guide 13 is limited at its first section 21 by a first light-input surface 27 and at its second section 25 by a second light-input surface 29. The two light-input surfaces 27, 29 are formed by two opposing transverse sides of the light guide 13 in longitudinal direction of the light guide 13, that is, with regard to the longitudinal axis 19. The light-input surfaces 27, 29 are preferably constructed as plane surfaces. However, if necessary, they can also be adapted to the light distribution of the light source and exhibit a shape that deviates from a plane surface. One recognizes that the inclination of the two sides 15, 17 along the longitudinal axis 19 in the direction of the first light input surface 27 to the second light input surface 29 continuously declines, which leads to an overall curved shape of the light guide 13 in longitudinal section.

At each light-input surface 27, 29, at least one light source, which can preferably be realized as a semi-conductor light source, for example, a light-emitting diode (LED) 31, is arranged. In the shown embodiment, several light-emitting diodes 31 are arranged next to one another at the light-input surface 27, 29. The light-emitting diodes are offset to one another in a direction orthogonal to the drawing plane of FIG. 1. The light sources can be fastened on the light guide as a light module or fastened as a separate, if necessary, interchangeable module in the headlight in such a way that a reliable coupling-in of light is guaranteed. In the case of a light source constructed as LED 31, it can be arranged and fastened on a circuit board in the light module. One or more of the LEDs 31 can have at least one optic and at least one cooling body assigned to them.

The light guide 13 exhibits in its first section 21 cubic-block-shaped first decoupling elements 33 that are arranged on the first side 15 of the light guide 13 and constructed in one piece with the light guide 13. Each first decoupling element 33 has a reflector 35 assigned to it. The reflector is arranged on a side of the respective first decoupling element 33 averted from the first light-input surface 27 and can be constructed as a separate part from the light guide 13. The first decoupling elements 33 each exhibit a first light-output surface 36 on the side averted from the first light-input surface 27. The reflectors 35 exhibit a shape selected corresponding to a desired light distribution of the light emitted by the illumination device 11. For example, it can be the shape of a paraboloid or an ellipsoid. Instead of the shown first decoupling elements 33, which are constructed as cubic-block-shaped, preferably cubed elevations on the first side 15 of the light guide 13, the first decoupling elements 33 can also exhibit a different shape—for example, the shape of a sphere segment, in particular, the shape of a semi-sphere. The shape could also be triangular, in particular, as in the view of FIG. 1, wherein the exit surface of the cube/cubic block indicated there is retained. The reason for this is to prevent undercuts.

As far as the structure and/or shape of the first decoupling elements 33 and reflectors 35 as well as arrangement of the first decoupling elements 33 on the light guide 13 and relative to the reflectors 35 are concerned, in addition, reference in all points is made to DE 10 2008 016 764.

In the second section 25, the light guide 13 exhibits second decoupling elements 37 that are arranged on the second side 17 of the light guide 13. Hence, the first decoupling elements 33 and second decoupling elements 37 are arranged on different sides 15, 17 of the light guide 13. In the embodiment shown in FIG. 1, the second decoupling elements 37 are realized as cubic-block-shaped elevations on the second side 17 of the light guide 13. Each second decoupling element 37 exhibits a second light-output surface 39 on a side averted from the second light-input surface 29. In contrast to the first decoupling elements 33, the second decoupling elements 37 do not have any reflectors 35 assigned to them.

In the case of the operation of the illumination device 11, the light-emitting diodes 31 emit light that is coupled-in to the light guide 13 via the two light-input surfaces 27, 29. Light beams 41 of the light coupled-in via the first light-input surface 27 are conveyed substantially along a direction of light diffusion 42 of the light guide (that is, in the direction of its longitudinal axis 19) by total internal reflection—in particular, on the two sides 15, 17 and joint faces not provided with their own respective reference numbers between the surfaces 15 and 17—and reach the first decoupling elements 33. The joint face running parallel to the drawing plane could, however (for example, for design reasons or injection-molding reasons), be rounded or inclined. The light beams 41 exit the first decoupling elements 33 via their first light-output surfaces 36 and impinge on the reflectors 35 assigned to the corresponding decoupling elements 33. The reflectors 35 deflect the light beams 41 in such a way that they penetrate the light guide 13 and exit the illumination device 11 at least approximately in the main direction of light emission 23. With regard to the function of the first decoupling elements 33—in particular, their interaction with the reflectors 35—reference in all points is made to DE 10 2008 016 764.

The light coupled-in to the light guide 13 via the second light-input surface 29 is conveyed in longitudinal direction of the light guide 13 (that is, in the direction of its longitudinal axis 19) within the light guide 13 by total internal reflection—in particular, on the two sides 15, 17 and joint faces not provided with their own respective reference numbers between the surfaces 15, 17. The joint face running parallel to the drawing plane could, however (for example, for design reasons or injection-molding reasons), be rounded or inclined. Within the light guide 13, the light coupled-in via the second light-input surface 29 with regard to the longitudinal axis 19 is conducted in a direction that is opposed to the direction along which the light coupled-in via the first light-input surface 27 is conducted. The light beams 41 of the light coupled-in via the second light-input surface 29 at least sometimes reach the second decoupling elements 37 and exit the decoupling elements 37 via their second light-output surfaces 39, wherein the light beams 41 on the second light-output surfaces 39 are refracted.

An angle between the desired main direction of light emission 23 and direction of the light beams 41 is relatively slight in the second section 25. Often, the light beams 41 in the second section 25 run approximately parallel to the main direction of light emission 23. Consequently, through the refraction at the second light-output surfaces 39, a relatively slight deflection of the corresponding light beams 41 arises. That is, at least some of the light beams 41 retain their direction in the case of penetration through the second light-output surfaces 39 at least approximately.

Both at the first section 21 and second section 25, the light beams 41 finally exit the illumination device 11 via the second side 17 of the light guide 13. The second side 17, hence, forms a light-emission side of the illumination device 11. Since the light beams 41 in the first section 21 are first decoupled via the first decoupling elements 33 on the first side 15 (to then be reflected by the reflectors 35 and again conducted through the light guide 13 so that they finally emerge exit from the second side 17), the first section 21 works in accordance with the principle of an indirect coupling-out of light. On the other hand, the second decoupling elements 37 emit the light beams 41 directly to the second side 17 of the light guide 13. Hence, this is a direct coupling-out of light. The illumination device 11 combines the indirect and direct coupling-out of light and, as a result, achieves a high efficiency—that is, a relatively large amount of the output of the coupled-out light in the coupled-in light. In regions of the light guide 13 in which an angle between the sides 15, 17 and main direction of light emission 23 is relatively large (that is, in the first section 21), the light is coupled-out indirectly via the first decoupling elements 33 and reflectors 35. In regions in which this angle is relatively slight (that is, in the second section 25), the light is directly coupled-out via the second decoupling elements 37. As a result of this, situations are avoided in which individual light beams 41 impinge on undesired places of the reflectors 35 and, as a result, are reflected in an undesired direction or absorbed.

Depending on more precise configuration of the illumination device 11, a viewer who looks against the main direction of light emission 23 at the second side 17 of the light guide 13 of the illumination device 11 in operation perceives individually radiant regions—for example, in the form of points of light or spots located in the region of the individual decoupling elements 33, 37. In this sense, the decoupling elements 33, 37 are "virtual light sources."

A degree of the deflection of the light beams 41 on the individual second light-output surfaces 39 can be achieved by the purposeful design of the shape and/or location of the second light-output surfaces 39. As a result of this, the direction of the individual light beams 41 exiting from the light guide 13 via the second light-output surfaces 39 and, hence, a desired light distribution of the light emitted by the illumination device 11 can be achieved. In the shown embodiments, the second light-output surfaces 39 are constructed in such a way that light beams 41 coupled-out via the second light-output surfaces 39 do not fall on other decoupling elements 33, 37—in particular, not on the respective adjacent second decoupling element 37. In the following, individual embodiments of the illumination device 11 will be described that differ with regard to the precise design of the second light-output surfaces 39.

Figure 2:
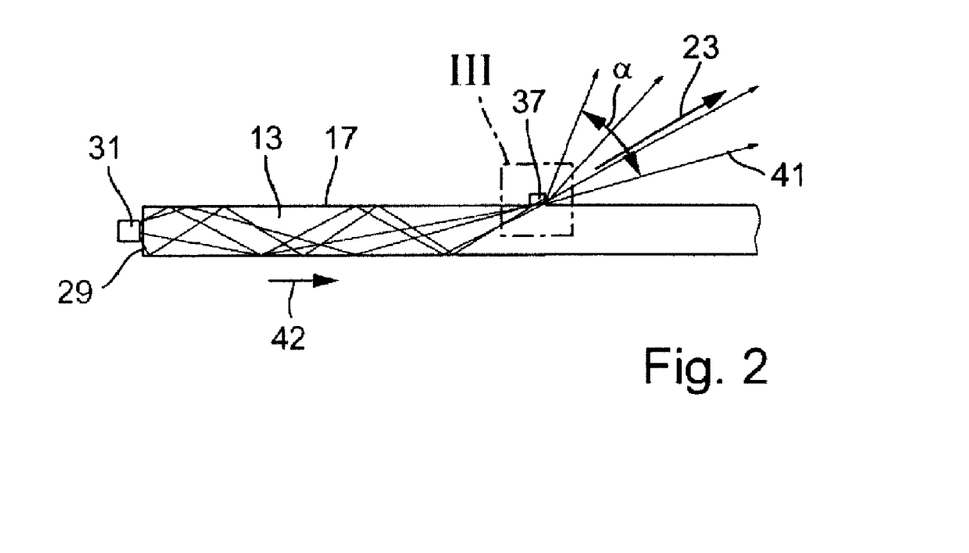
FIG. 2 is a top view of a section of a light guide of the illumination device for a motor vehicle of the invention shown in FIG. 1.
Figure 3:
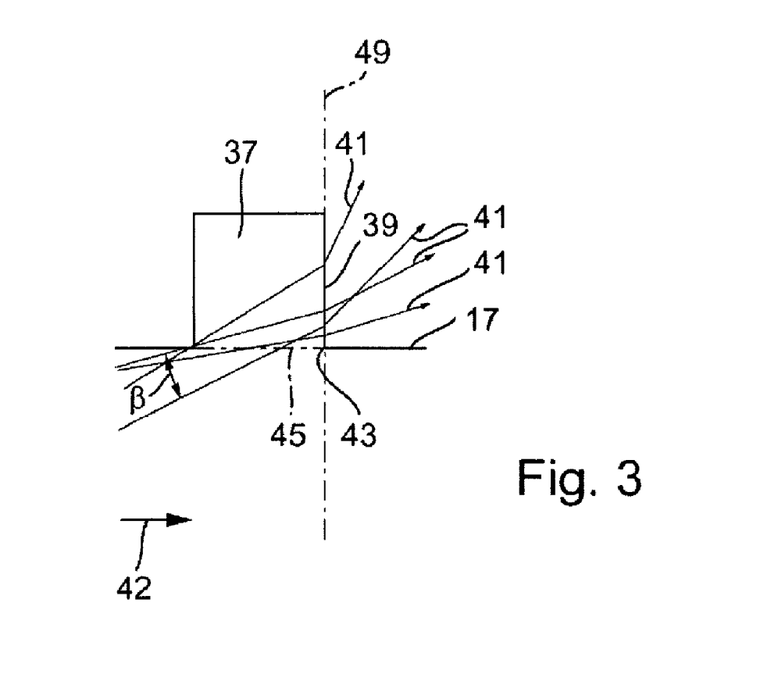
FIG. 3 is a detailed view of the section of the light guide of the illumination device for a motor vehicle of the invention shown in FIG. 2.

FIGS. 2 and 3 show the light guide 13 the second decoupling element 37 of which is cube-shaped. Although the light guide 13 is at least curved in sections (FIG. 1), it is represented as being straight in FIGS. 2 and 3 for simplicity's sake.

The second light-output surface 39 runs at least substantially orthogonally to the second side 17 of the light guide 13. In the case of a curvature of the first side 15, the second light-output surface 39 runs at least substantially orthogonally to a tangent plane through an edge 43, which connects the second light-output surface 39 to the second side 17. A first opening angle "α" of a light bundle, which consists of the light beams 41 that are coupled-out via the second light-output surface 39, depends on a second opening angle "β" of the light beams entering the second decoupling element 37 via an entry plane 45. The second opening angle "β" includes all light beams 41 incident to the second decoupling element 37. The light beams are able to be conveyed within the light guide by total internal reflection to its two sides 15, 17. The second opening angle "β" arises, in particular, from the geometry of the light guide 13, its index of refraction, and the index of refraction of the vicinity of the light guide 13 (normally air).

It can be seen, in particular, from FIG. 3 that a portion of the light beams 41 on the second light-output surface 39 is only slightly refracted while another part of the light beams 41 is considerably refracted so that they are deflected from the second side 17 in the representation of FIG. 3 upward. As a result of this, a relatively large first opening angle "α" of the light bundle emerging from the light guide 13 arises. In particular, the first opening angle "α" is larger than the second opening angle "β."

Figure 4:
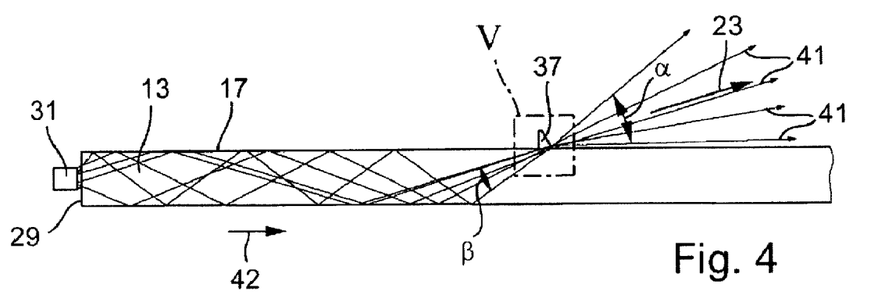
FIG. 4 is a top view of a section of the light guide of the illumination device for a motor vehicle of the invention in accordance with a second embodiment thereof.
Figure 5:
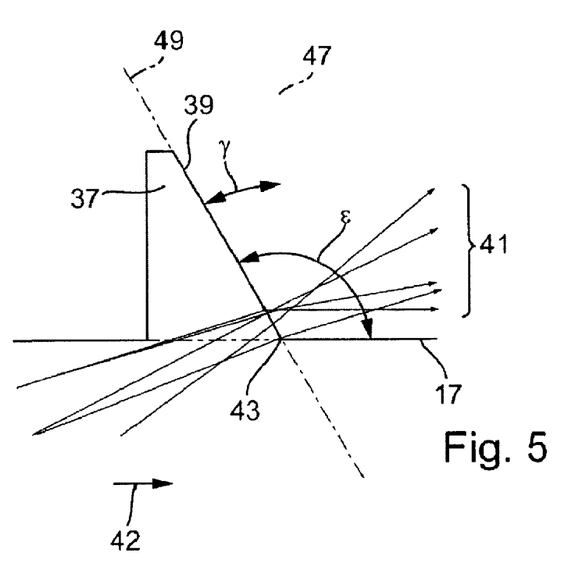
FIG. 5 is a detailed view of the section of the light guide of the illumination device for a motor vehicle of the invention shown in FIG. 4.

Through the selection of a different inclination of the second light-output surface, 39 a smaller opening angle "α" can be achieved. A correspondingly configured second decoupling element 37 is shown in FIGS. 4 and 5. Here, the curved light guide 13 is shown as being straight for simplicity's sake. The second light-output surface 39 of the second decoupling element 37 represented there is inclined vis-à-vis an orthogonal 47 to the second side 17 or tangent plane through the edge 43 by an angle of inclination "γ"=30° along the direction of light diffusion 42 of the light beams 41 in the light guide 13 and main direction of light emission 23. As a result of this, on the edge 43, an obtuse angle "ε">90° arises between the second light-output surface 39 and second side 17. In deviation of the shown embodiment, the angle of inclination "γ" can also exhibit a different value. The angle of inclination "γ" can, for example, exhibit a value between 0° and almost 90°. The inclination of the light-output surface by an angle "γ" results in the angle "α" in FIG. 4 being smaller than the angle "α" in FIG. 2, in case the two decoupling elements are irradiation with a bundle of the same opening angle "β." The inclination of the light-output surface, thus, results in a narrowing of the bundle since the steep incoming beams are no longer very strongly refracted like the uppermost beam 41 in FIG. 3.

Figure 6:
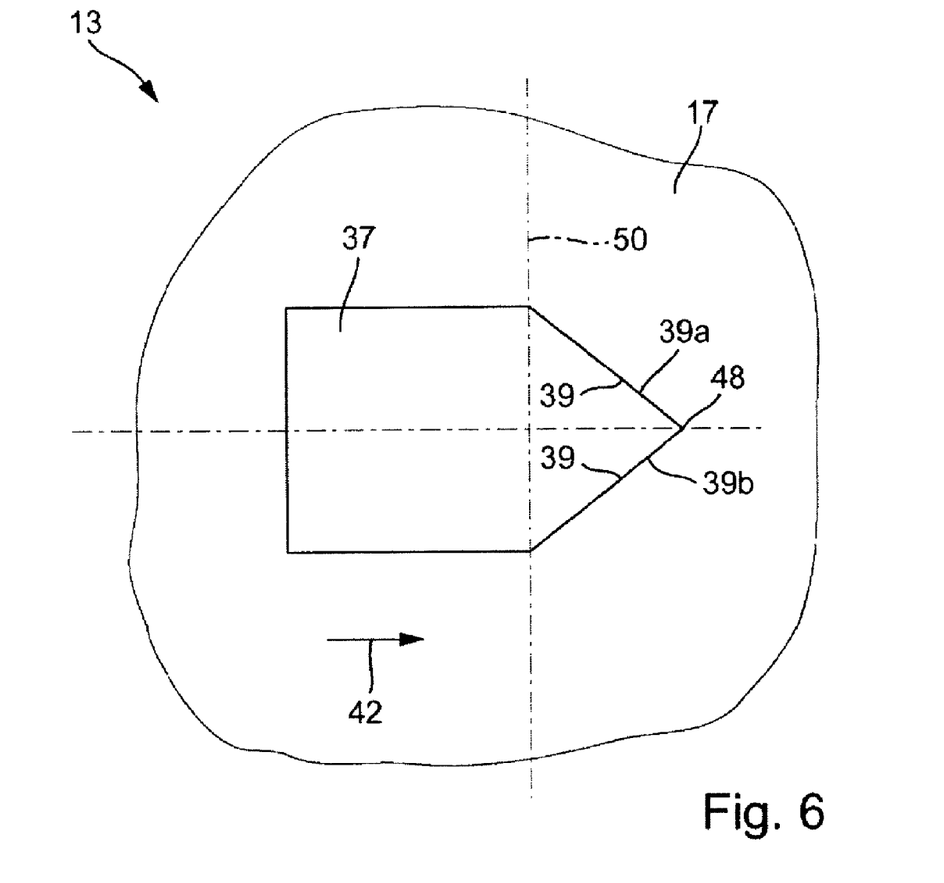
FIG. 6 is a lateral view of a section of the light guide of the illumination device for a motor vehicle of the invention in accordance with a third embodiment thereof.

In an embodiment shown in FIG. 6, the second light-output surface 39 is divided into two sections 39a, 39b. The two sections 39a, 39b are inclined vis-à-vis a transverse plane 50 of the light guide 13, which runs orthogonally to the second side 17, direction of light diffusion 42, or longitudinal axis 19 within the light guide 13. The two sections 39a, 39b adjoin on a convex front edge 48 of the second light-output surface 39 so that an arrow-like shape of the light-output surface 39 arises. As a result of this, the light beams 41 are laterally deflected—that is, in the case of penetration through the second light-output surface 39 in the representation of FIG. 6, are deflected upward and/or downward or exit the drawing plane of FIGS. 2 through 5.

In the embodiment shown in FIG. 6, the front edge 48 runs orthogonally to the second side 17. In deviation from this, however, provision can also be made that the light-output surface 39 exhibits the angle of inclination "γ"≠0. In this case, the front edge 48 is inclined against the direction of light diffusion 42—that is, not orthogonal to the second side 17.

In an embodiment not shown, the second light-output surface 39 is inclined vis-à-vis the transverse plane 50 without being divided into sections 39a, 39b.

Figure 7:
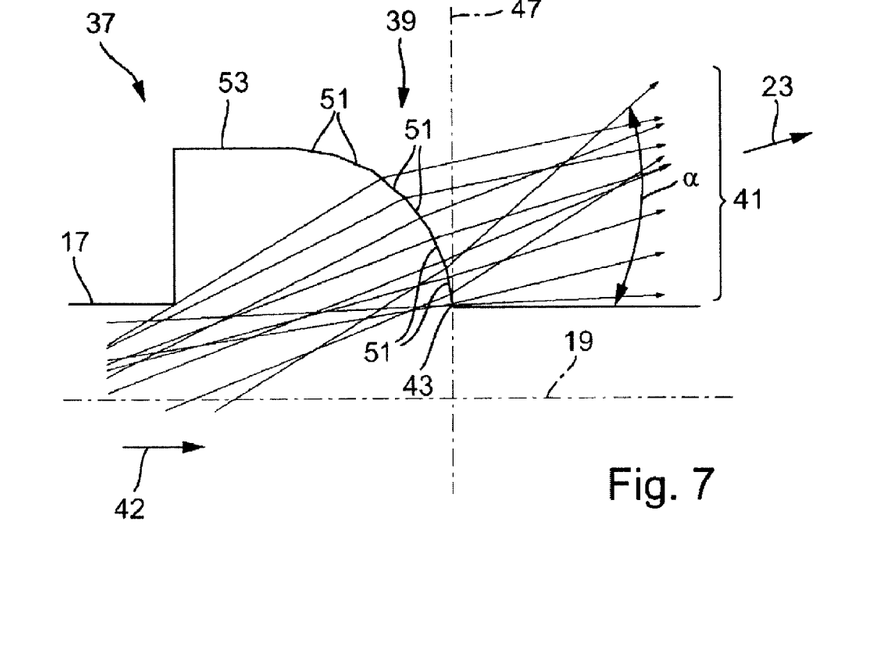
FIG. 7 is a top view of a section of the light guide of the illumination device for a motor vehicle of the invention in accordance with a fourth embodiment thereof.

FIG. 7 shows a second decoupling element 37 the second light-output surface 39 of which includes several rectangular surface elements 51 arranged next to one another in the longitudinal section of the second decoupling element 37, wherein each surface element 51 exhibits a different angle of inclination vis-à-vis the orthogonal 47. Adjacent surface elements 51 adjoin one another on edges that run orthogonally to a plane spanned by the orthogonal 47 and longitudinal axis 19 or direction of light diffusion 42. The surface element 51, which directly adjoins the edge 43, exhibits the smallest angle of inclination of all surface elements 51. The angle of inclination of the surface elements 51 increases with its distance to the edge 43. The surface element 51 farthest removed from the edge 43 consequently exhibits the greatest angle of inclination of all surface elements 51. At the surface element 51 farthest removed from the edge 43, a surface arranged parallel to the second side 17 adjoins. Through this shape of the second light-output surface 39, an especially small opening angle "α" of the light bundle coupled-out via the second light output surface 39 arises. As a result, a relatively large light intensity of the coupled-out light is achieved in the region of the main direction of light emission 23.

The angle of inclination of the individual surface elements 51 is selected in such a way that the light beams 41 coupled-out via the second light-output surface 39 form a desired light distribution. In the shown embodiment, the second light-output surface 39 includes, by way of example, six surface elements 51. The light-output surface 39 can, however, also be constructed with such a high number of surface elements 51, preferably applying computer-supported methods. In the case of the use of conventional production methods to produce the light guide 13 together with the second decoupling element 37, an at least approximately smooth shape of the second light-output surface 39 arises. In this case, edges running transversely to the direction of light diffusion 42 and/or longitudinal axis 19 between the individual surface elements 51 are practically no longer present.

In the following, the construction principle for determining the free-form of the second light-output surface 39 formed from the surface elements 51 will be explained with the help of FIGS. 8 and 9.

Figure 8:
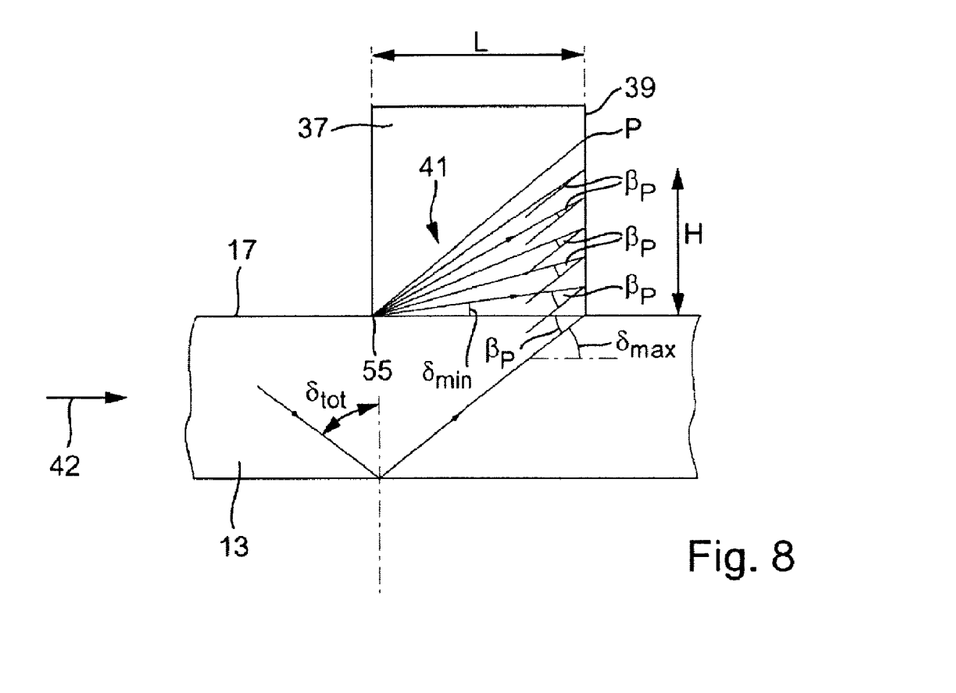
FIG. 8 is a view illustrating progression of light beams in a decoupling element of the light guide of the illumination device for a motor vehicle of the invention.

FIG. 8 illustrates a connection between a distance "H" of the second side 17 of a point "P" on the second light-output surface 39 and a first opening angle of the light bundle, which emerges from the second decoupling element 37 at point "P." This opening angle directly depends on the second opening angle "$\beta_P$" of the light beams 41 running in the interior of the second decoupling element 37 and impinging on point "P." The second opening angle "$\beta_P$" is determined by an angle "$\delta_{max}$" of those light beams 4 that run the most precipitously within the light guide 13 and an angle "$\delta_{min}$" of those light beams 41 that run the deepest within the second decoupling element 37—that is, $\beta_P=\delta_{max}-\delta_{min}$. In the case of the latter light beams 41, it is a matter of those light beams 41 that can still pass a rear edge 5 averted from the second light-output surface 39 between the second decoupling element 37 and second side 17. The two angles "$\delta_{max}$," "$\delta_{min}$" refer to the horizontal of FIG. 8—that is, to a plane parallel to the left side 17. The angle "$\delta_{min}$" arises from a length "L" of the second decoupling element 37 and the distance "H." The following holds true: $\delta_{min}=\arctan(H/L)$. The angle "$\delta_{max}$" is the complementary angle to the limiting angle of the total internal reflection "$\delta_{tot}$" of the light guide 13—that is, $\delta_{max}=90°-\delta_{tot}$. At the same point "P," at which the two angles are equal (that is, when $\delta_{min}=\delta_{max}$ holds true), the second opening angle "$\beta_P$"=$\delta_{max}-\delta_{min}$=0. Only one light beam 41 impinges on this point "P." In the representation of FIG. 8, above this point "P," no light beams 41 impinge on the second light-output surface 39—that is, the second light-output surface 39 is "screened" above this point "P."

In consideration of, in particular, the above-described optical properties, the second decoupling element 37 can be constructed in such a way that the light bundle exiting from its second light-output surface 39 exhibits a desired direction of propagation and opening angle—in particular, a relatively small opening angle. To this purpose first (as schematically represented in FIG. 9), the second light-output surface 39 of an imagined rectangular or cubed second decoupling element 37 is divided into several small surface elements 51. Subsequently, the angle of inclination "γ" and position of the surface elements 51 are specified.

Figure 9:
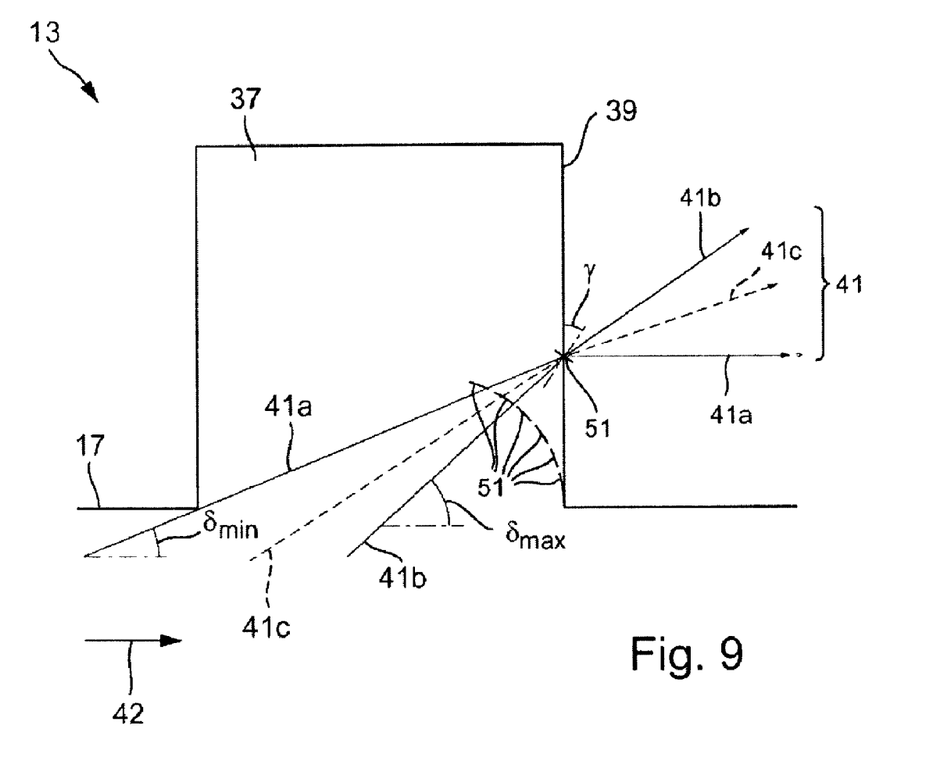
FIG. 9 is a view illustrating the progression of the light beams in a surface element of the decoupling element of the light guide of the illumination device for a motor vehicle of the invention shown in FIG. 8.

In FIG. 9, a first peripheral ray 41a, which exhibits the minimum angle of entry "$\delta_{min}$" into the considered surface element 51, and a second peripheral ray 41b, which exhibits the maximum angle of entry "$\delta_{max}$" into the considered surface element 51, are indicated. Further, a central light beam 41c is entered, which, in the interior of the second decoupling element 37, corresponds to a bisector of an angle with regard to the two peripheral rays 41a, 41b.

The angle of inclination "γ" of the considered surface element 51 is defined in such a way that the light bundle stretched through the two peripheral rays 41a, 41b is refracted into a desired direction by the considered surface element 51. In the representation of FIG. 9, the first peripheral ray 41a should be parallel to the second side 17 of the light guide 13 after its penetration through the considered surface element 51. This has as its consequence the fact that the total emerging light bundle is refracted away from the second side 17. After the angle of inclination "γ" of the surface element 51 has been determined, the surface element 51 is moved along its central light beam 41c to the second side 17 so that a closed, convex shape of the second light-output surface 39 composed of the surface elements 51 arises. The location of the six surface elements 51 (in total) is likewise shown in FIG. 9.

Figure 10:
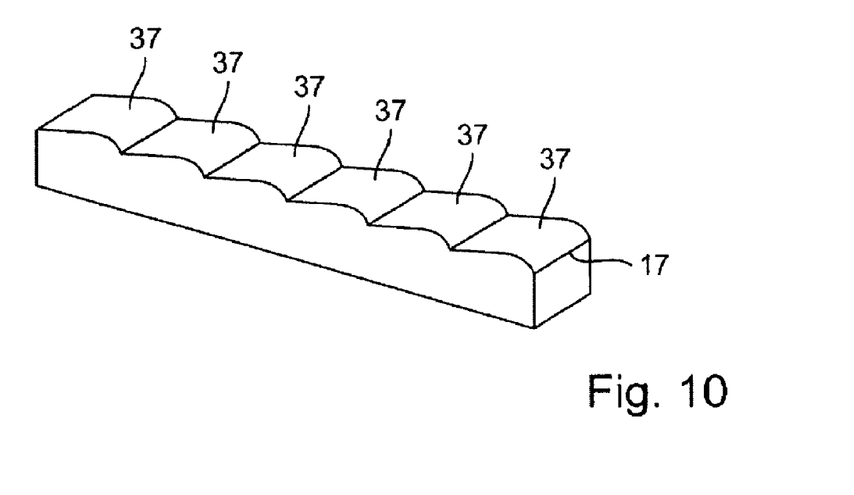
FIG. 10 is a perspective view of the illumination device for a motor vehicle of the invention in accordance with a fifth embodiment thereof.

In general, high degrees of freedom exist in the design of the second decoupling element 37. Hence, the shape of the second decoupling element 37 can be varied in broad boundaries. For example, the light guide 13 (as shown in FIG. 10) can exhibit scale-like second decoupling elements 37 arranged next to one another on its second side 17. In addition, it is also conceivable that, in dependency on an installation space provided for the illumination device 11 in a vehicle and a desired light function of the illumination device 11, the illumination device exhibits only the first decoupling elements 33 or second decoupling elements 37. Finally, the illumination device 11 can also be used for ambient lighting—for example, the lighting of an interior of a motor vehicle.

The illumination device 11 has been described in an illustrative manner. It is to be understood that the terminology that has been used is intended to be in the nature of words of description rather than of limitation. Many modifications and variations of the illumination device 11 are possible in light of the above teachings. Therefore, within the scope of the appended claims, the illumination device 11 may be practiced other than as specifically described.

What is claimed is:

1. An illumination device (11) for a motor vehicle comprising:
   a transparent light guide (13);
   at least a first decoupling element (33) formed into said light guide (13);
   at least one reflector (35) assigned to said first decoupling element (33) for reflection of light coupled-out by said first decoupling element (33) and aligned and formed in such a way that at least a portion of said light reflected by said reflector (35) irradiates said light guide (13); and
   at least one second decoupling element (37) formed in said light guide (13) for coupling-out of light from said light guide (13) and aligned and formed in such a way that light coupled-out by said second decoupling element (37) ultimately exits said light guide (13).

2. An illumination device (11) for a motor vehicle as set forth in claim 1, wherein said light guide (13) includes plastic and is plate-shaped.

3. An illumination device (11) for a motor vehicle as set forth in claim 2, wherein said light guide (13) includes polymethylmethacrylate.

4. An illumination device (11) for a motor vehicle as set forth in claim 1, wherein said first decoupling element (33) is arranged on a first side (15) of said light guide (13) and said second decoupling element (37) is arranged on a second side (17) of said light guide (13), said second side (17) facing said first side (15).

5. An illumination device (11) for a motor vehicle as set forth in claim 4, wherein said light guide (13) is at least in sections curved such that an angle of said second side (17) varies with reference to a main direction of light emission (23) along a longitudinal axis (19) of said light guide (13).

6. An illumination device (11) for a motor vehicle as set forth in claim 1, wherein said first decoupling element (33) is located in a first section (21) of said light guide (13), said second decoupling element is located in a second section (25) of said light guide (13), and an angle within said first section (21) is smaller than within said second section (25).

7. An illumination device (11) for a motor vehicle as set forth in claim 5, wherein said light guide (13) exhibits a first light-input surface (27) for coupling-in of light that can be decoupled via a first light-output surface (36) of said first decoupling element (33) and a second light-input surface (29) for coupling-in of light that can be decoupled via a second light-output surface (39) of said second decoupling element (37) and said light-input surfaces (27, 29) with reference to said longitudinal axis (19) of said light guide (13) are offset to one another.

8. An illumination device (11) for a motor vehicle as set forth in claim 7, wherein said second light-output surface (39) runs at least substantially orthogonally to said second side (17) of said light guide (13).

9. An illumination device (11) for a motor vehicle as set forth in claim 7, wherein said second light-output surface (39) is included opposite said second side (17) of said light guide (13) in such a way that said second light-output surface (39) and second side (17) outside of said light guide (13) enclose an obtuse angle ($\epsilon$).

10. An illumination device (11) for a motor vehicle as set forth in claim 7, wherein said at least a section (39a, 39b) of said second light-output surface (39) is inclined vis-à-vis a transverse plane (50) of said light guide (13) orthogonal to said second side (17) of said light guide (13) and to a direction of light diffusion (42) in said light guide (13).

11. An illumination device (11) for a motor vehicle as set forth in claim 10, wherein said sections (39a, 39b) adjoining one another at a convex front edge (48) of said second light-output surface (39) are inclined in opposing directions vis-à-vis said transverse plane (50).

12. An illumination device (11) for a motor vehicle as set forth in claim 7, wherein said second light-output surface (39) exhibits an overall uneven shape for influencing a direction of light beams (41) to be coupled-out via said second light-output surface (39) and influencing an opening angle of a bundle of beams formed by said light beams (41) to be coupled-out.

13. An illumination device (11) for a motor vehicle as set forth in claim 12, wherein said second light-output surface (39) is formed from a plurality of plane-surface elements (51) arranged next to one another and an angle of inclination of at least one of said plane-surface elements (51) with reference to a tangent plane of said second side (17) at one edge (43) differs from a corresponding angle of inclination of at least one of other said plane-surface elements (51).

14. An illumination device (11) for a motor vehicle as set forth in claim 13, wherein said angle of inclination of said plane-surface element (51) decreases with increasing distance to said second side (17) so that said second decoupling element (37) on said second light-output surface (39) exhibits a convex shape.

15. An illumination device (11) for a motor vehicle as set forth in claim 13, wherein said second light-output surface (39) is so high that said second light-output surface (39) exhibits substantially a smooth, edge-free shape.

* * * * *